(12) United States Patent
Becker et al.

(10) Patent No.: US 12,397,699 B2
(45) Date of Patent: Aug. 26, 2025

(54) OPEN TRAILER ASSEMBLY

(71) Applicants: Stephen Becker, Dorset, OH (US); David Herzog, Toledo, OH (US); Chaz Becker, Toledo, OH (US)

(72) Inventors: Stephen Becker, Dorset, OH (US); David Herzog, Toledo, OH (US); Chaz Becker, Toledo, OH (US)

(73) Assignee: Stephen Becker, Dorset, OH (US)

( * ) Notice: Subject to any disclaimer, the term of this patent is extended or adjusted under 35 U.S.C. 154(b) by 443 days.

(21) Appl. No.: 17/991,972

(22) Filed: Nov. 22, 2022

(65) Prior Publication Data
US 2024/0166117 A1    May 23, 2024

(51) Int. Cl.
| | |
|---|---|
| *B60P 3/075* | (2006.01) |
| *B60P 1/43* | (2006.01) |
| *B60P 3/077* | (2006.01) |
| *B62D 63/06* | (2006.01) |

(52) U.S. Cl.
CPC .............. *B60P 3/075* (2013.01); *B60P 1/435* (2013.01); *B60P 3/077* (2013.01); *B62D 63/061* (2013.01)

(58) Field of Classification Search
CPC ........... B60P 3/075; B60P 3/077; B60P 1/345; B62D 63/061; B62D 21/14; B60S 13/00; B62B 2201/10; B62B 2202/10
See application file for complete search history.

(56) References Cited

U.S. PATENT DOCUMENTS

| | | | | |
|---|---|---|---|---|
| 5,727,920 A | * | 3/1998 | Hull | B60P 3/127 280/43.19 |
| 11,148,575 B2 | | 10/2021 | couch | |
| 2005/0029776 A1 | * | 2/2005 | Koch | B62D 63/061 280/656 |
| 2020/0055438 A1 | * | 2/2020 | Couch | B60P 3/075 |
| 2022/0306225 A1 | * | 9/2022 | Kajita | E04H 6/305 |

FOREIGN PATENT DOCUMENTS

DE    102018221169 B4 *  2/2022  .............. B60S 13/00

\* cited by examiner

*Primary Examiner* — Daniel J Colilla
(74) *Attorney, Agent, or Firm* — R. Schuler (57) ABSTRACT

An open trailer for carrying an all-terrain vehicle (ATV) has a front hoop assemble that is slidably connected to tongue assembly and a rear hoop assembly that that is fixedly connected to a proximal end of the tongue assembly. The rear hoop assembly comprises an axle to which are attached to tires and two ramps. When in use, the vehicle is driven up the ramps and onto the trailer until the front wheels of the vehicle are supported by the front hoop assembly. As the vehicle continues to be driven onto the trailer, the front wheels push the front hoop assembly toward a distal end of the tongue assembly until the rear wheel of the vehicle are supported by the rear hoop assembly.

11 Claims, 11 Drawing Sheets

OPEN TRAILER ASSEMBLY

1. FIELD OF THE INVENTION

The present disclosure relates to an open trailer design suitable for carrying a vehicle from one place to another.

2. BACKGROUND

Open trailers suitable for general-purpose use are available in many different sizes and can be used to carry a wide variety of vehicles of different dimensions, functionality and weights. Unfortunately, any particular general-purpose trailer design may not be ideally suited to carry all types of vehicles, and so special purpose trailers have been designed to carry particular types of vehicles. For example, a large, open trailer designed to carry cars may not be practical for carrying smaller vehicles, such as motorcycles or ATVs, as it may be too expensive, too large to tow behind some vehicles, and not easily configured to accept an ATV for travel. Consequently, open trailers have been designed with characteristics (i.e., dimensions, configuration, durability/strength, etc.) that are suitable to carry particular types of vehicles.

Open trailers designed for carrying cars are typically larger, stronger, and costlier than trailers designed to carry All-Terrain Vehicles (ATVs), Utility-Terrain Vehicles (UTV) or Side-by-Side (SxS) Vehicles, all of which will be referred to hereinafter as ATVs. On the other hand, open trailers suitable for carrying smaller vehicles, such as an ATV, are typically designed with lighter weight, less expensive materials, a single axle with relatively small tires, one or more removable ramps used to safely drive the ATV onto the trailer, and some mechanism with which to secure or tie-down the vehicle while the trailer is being towed.

While many larger trailers, such as car carriers, are typically stored out-of-doors, it may be desirable to store a smaller, ATV trailer in a garage or shed, or some other covered structure. In this regard, some smaller trailers are designed to be collapsible for storage in a smaller space, such as a garage or shed.

Further, open trailers are typically designed with a bed (i.e., surface upon which a vehicle rests) having a particular length and width that is suitable to the particular type of vehicle being towed. So, for example, a car carrier bed length and width should be designed with dimensions sufficient to carry cars having a variety of dimensions. Still further, and depending upon the application, it may be desirable for the trailer bed to not be comprised of a solid material, but rather a metallic, mesh material that is lighter in weight and allows debris (i.e., dirt or grass material) to fall through the bed. Still further, it may be desirable for a trailer to not have a bed at all, but rather have to two tracks, each having a particular width and length, and being appropriately spaced to allow a two or four wheeled vehicle to be driven onto the trailer.

4. DETAILED DESCRIPTION

Typically, open trailers designed to carry relatively small vehicles, such as ATVs, have a bed comprised of a single sheet of material, and the single sheet can either be composed of a plywood or a metal mesh material. While an open trailer having a bed comprised of a single sheet of material can be capable of carrying a wide variety of small vehicles, they tend to be heavy and not designed to be disassembled or easily collapsed for storage, if they are collapsible at all. The weight of such open trailers can be attributed to the relatively large dimensions of the bed necessary to carry ATVs of different sizes. In this regard, a bed comprising a general-purpose ATV trailer has to be long enough and wide enough to carry the range of ATVs.

We have designed a general-purpose open trailer suitable for carrying ATVs having a wide range of wheel bases and axle lengths, and that can be easily disassembled into its component parts for storage. This trailer does not have a bed comprised of a single sheet of material, is light-weight, and can easily be configured or re-configured to carry ATVs having different wheel bases and axle length.

According to one embodiment, our trailer design has a first or axle hoop assembly and a second or front hoop assembly both of which function to support and to retain rear and front wheels of an ATV respectively. The axle hoop assembly is fixedly connected to a tongue assembly comprising the trailer, and the front hoop assembly is slidably connected to the tongue assembly and serves to receive front wheels of an ATV as it is driven onto the trailer. Once the ATV front wheels have engaged with the front hoop assembly, it can be easily moved from a starting position, at a proximal or axle end of the tongue assembly, to a final position towards a distal or hitch ball end of the tongue assembly as the ATV is driven onto the trailer. This movement of the front hoop assembly along the length of the tongue assembly, while an ATV is driven onto the trailer, effectively permits the trailer assembly to be dynamically configured (self-configured) to accept an ATV of any wheel base without operator intervention while the ATV is driven onto the trailer.

According to another embodiment, the axle hoop assembly is comprised of first and second axle tube sliders that slide into and out of opposite ends of a first and a second axle tube that are fixedly connected to the proximal end of the tongue assembly. Further, the front hoop assembly is comprised of first and second front hoop sliders that slide into and out of opposite ends of a first front hoop tube and a second front hoop tube both of which are fixedly connected to the distal hitch ball end of the tongue assembly. In this regard, both the two axle hoop sliders and the two front hoop sliders are telescoping sliders that can be manually extended or shortened to accommodate relatively longer or shorter ATV axle lengths. This axle hoop and front hoop assembly designs allow an individual to quickly and easily adjust the end-to-end length of both assemblies to accept ATVs having relatively longer or shorter front and/or rear axle lengths.

Figure 1:
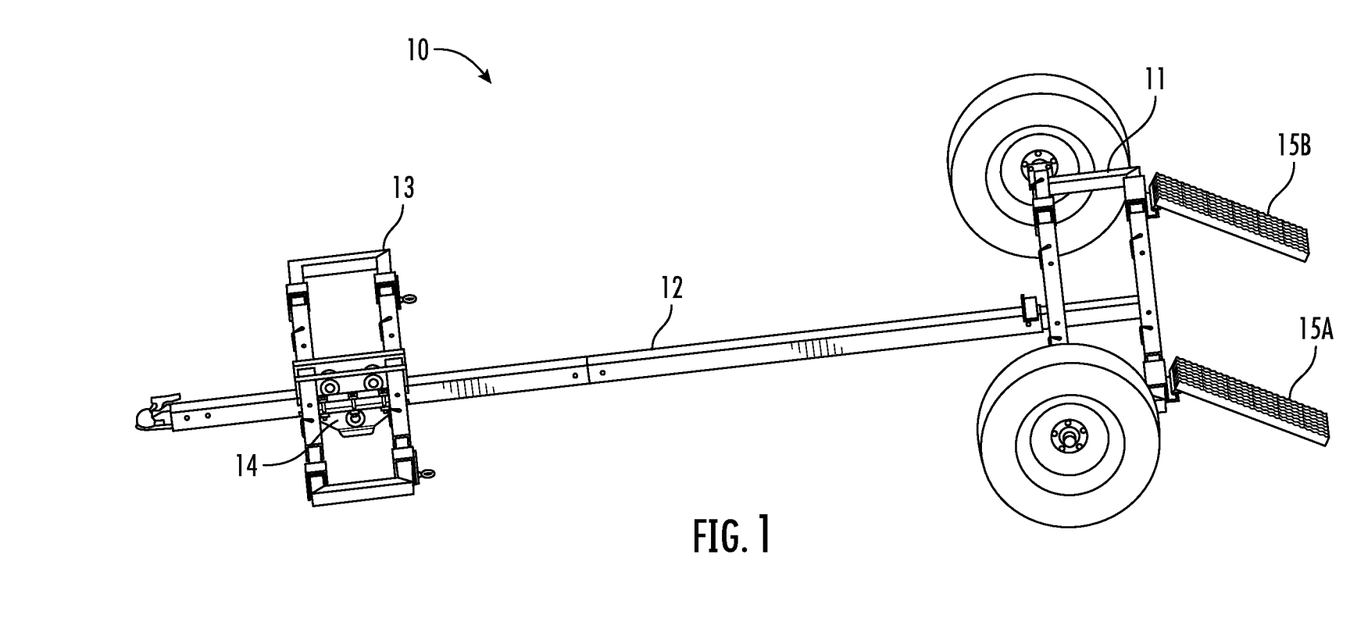
FIG. 1 is an illustration of a trailer assembly 10

The above-described advantages and other advantages comprising our trailer design will now be described with reference to the Figures, in which FIG. 1 is an illustration of a full trailer assembly 10 having an axle hoop assembly 11, a tongue assembly 12, and a front hoop assembly 13. The axle hoop assembly 11 is removably attached to the proximal end of the tongue assembly 12, and the front hoop assembly 13 can be removed by sliding it off the tongue assembly. The front hoop assembly is fixedly connected to a carriage assembly 14 which rides on a top surface of the tongue assembly, and which permits the front hoop assembly to be easily moved along substantially the entire length of the tongue assembly. As will be described later with reference to FIGS. 5A and 5B, the front hoop carriage assembly 14 has three slider wheels, with two of the slider wheels riding on and in contact with a top surface of the tongue assembly, and one wheel riding on and in contact with an opposite surface of the tongue assembly. The carriage assembly 14 operates to allow the front hoop assembly to freely move in a direction away from or towards the proximal end of the tongue assembly depending upon whether an ATV is being driven onto or off the trailer assembly respectively. And finally with reference to FIG. 1, the trailer 10 has two ramps 15A and 15B that are removably attached to the axle hoop assembly 11 to facilitate driving the ATV onto and off the trailer. As was described earlier, the trailer assembly 10 can be quickly and easily disassembled into several component parts for storage by simply removing clevis pins attaching the axle hoop 11 from the tongue 12, and one section of the tongue from another section, and by sliding the front hoop 13 off the tongue. Both the axle hoop and the front hoop assemblies can be removed from the tongue assembly, and the tongue assembly can be disassembled into two parts. Further, and as necessary for storage, both the axle hoop and the front hoop assemblies can be easily disassembled.

Figure 2A:
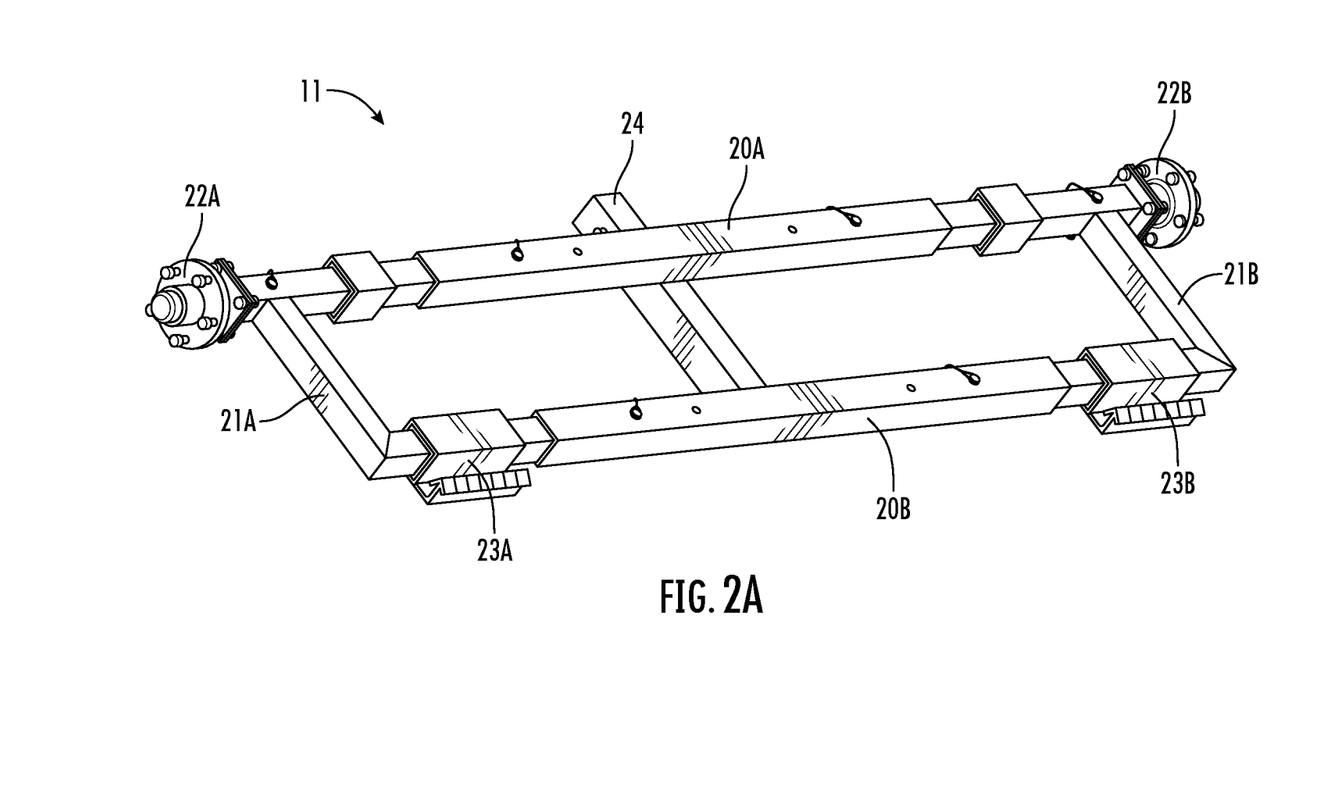
FIG. 2A is an illustration showing an axle hoop assembly 11 comprising the trailer assembly 10.

FIG. 2A is an illustration showing the axle hoop assembly 11 described with reference to FIG. 1. The axle hoop assembly 11 is comprised of two axle hoop tubes 20A and 20B both of which are fixedly connected to an axle hoop support tongue 24. The two axle hoop tubes can be composed of any suitable metallic or non-metallic material (i.e., steel), and can be designed to have a four-sided polygonal shape in cross-section, such as a square. According to one embodiment, the dimension of each side of the square is 2.5 inches wide and the thickness of each side is ¼ inch, although the dimensions and thickness can be greater more or thinner depending upon the application. The hoop support tongue can be composed of any suitable metallic or non-metallic material, can be square in cross-section with the dimension of each side being 2.5 inches wide and ¼ inches thick. The assembly 11 has two axle hoop sliders 21A and 21B each of which slide into opposite ends of the axle hoop tubes 20A and 20B respectively. Both sliders are composed of any suitable metallic material, are square in shape, and the dimension of each slider side being 2 inches with a thickness of ¼ inch. Each axle hoop slider 21A and 21B has a respective wheel hub 22A and 22B connected to it for receiving a wheel (not shown). Each axle hoop slider 21A and 21B also has a ramp slider, 23A and 23B respectively, that are removably connected to the axle hoop sliders and function to receive a ramp shown with reference to FIG. 1. The position of each axle hoop slider 21A and 21B with respect to the axle tubes 20A and 20B is maintained by two wire-lock clevis pins that are placed into holes drilled through each axle hoop tube 20A and 20B and which holes register with holes drilled through the axle hoops sliders 21A and 21B. According to this embodiment, the distance between an end of one axle hoop to the other axle hoop (i.e., length of the axle) can made longer or shorter by pulling each of the axle hoop sliders 21A and 21B out of or pushing them into the axle tubes 20A and 20B, thereby permitting the axle hoop assembly to receive ATVs of longer or shorter axle lengths. In this regard, the axle tube assembly has telescoping functionality.

Continuing to refer to FIG. 2A, the axle hoop assembly 11 functions to receive rear wheels comprising an ATV. The hoop assembly 11 is designed so that each ATV wheel is securely supported by the hoop assembly 11 in only two places. This hoop design minimizes the metal material needed to support an ATV wheel which has the consequence of minimizing the axle hoop assembly weight, and has the further advantage of allowing the axle hoop assembly to securely support ATVs having a range of wheel diameters [Question . . . any other advantages].

Figure 2B:
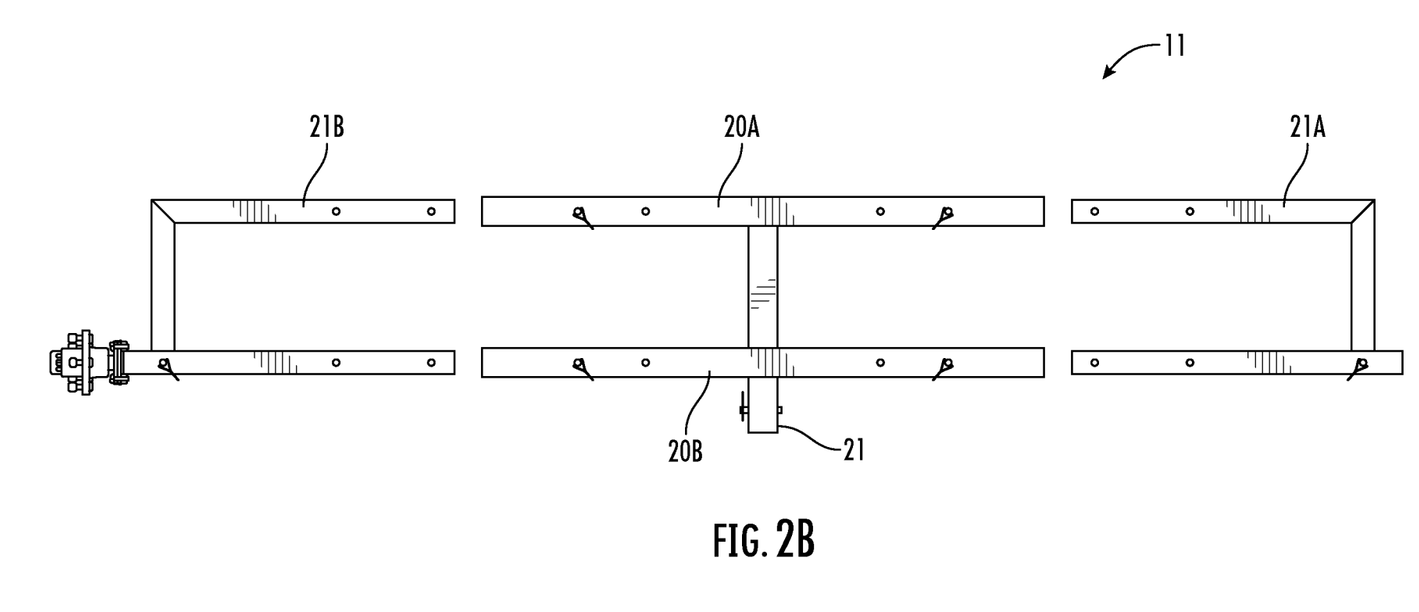
FIG. 2B is an illustration showing the axle hoop assembly 11 exploded to show component parts.

FIG. 2B is an illustration showing substantially the same axel hoop assembly 11 described earlier with reference to FIG. 2A with the axle hoop sliders 21A and 21B removed from of the axle hoop tubes 20A and 20B. According to the embodiment shown in FIGS. 2A and 2B, the axle hoop sliders are constructed of tubing that is generally in a "U" shape, As can be seen, each axle hoop slider and axle hoop tube have four through holes drilled to receive clevis pins, which when inserted into the axle tube holes and through the holes in the axle hoop slider serve to retain the position of the axle tube sliders with respect to the axle hoop tube. The axle hoop tubes and the axle hoop sliders can have more or fewer holes that show in the Figure, and the dimensions and gauges of the tubes can be greater or lesser depending upon the type of vehicle being carried.

Figure 3A:
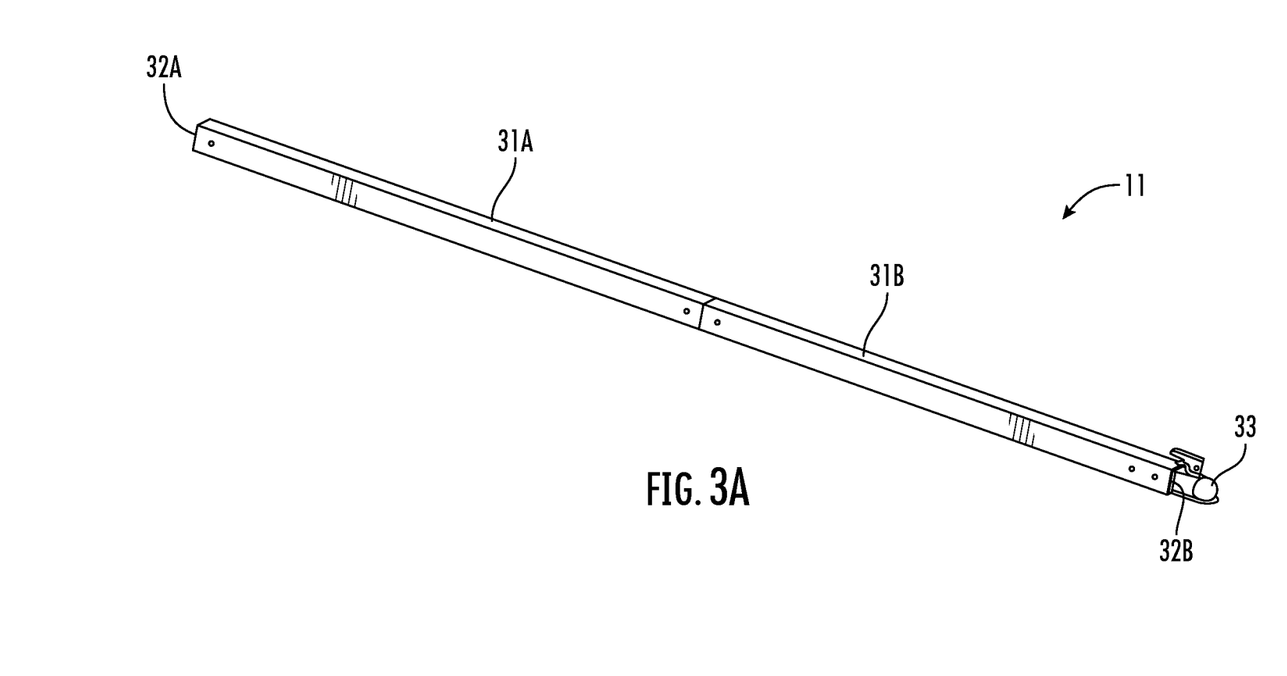
FIG. 3A is an illustration showing a tongue assembly 12 comprising the trailer assembly 10.

FIG. 3A is an illustration showing the tongue assembly 12 described earlier with reference to FIG. 1. The tongue assembly 12 is designed to serve as a connection between the axle hoop assembly 11 and the slider wheel assembly 14. The slider wheel assembly is designed to ride on and move along the tongue assembly between a distal hitch ball end 32B and a proximal axle hoop end 32A. The tongue assembly 12 is comprised of two, straight tube sections 31A and 31B composed of any suitable metallic material, and with each tube being a four-sided polygonal shape in cross section, and each side of the polygon being 3 inches wide and the thickness being ¼ inch. The two tongue sections 31A and 31B are removably connected to each other by a tongue connector (not shown) that inserts into an open end of each tongue 31A and 31B, and the two sections of the tongue assembly are held in place by one or more clevis pins inserted into through holes in the tongue sections and the tongue connector. This design arrangement permits the tongue assembly 12 to be quickly and easily disassembled for storage.

Figure 3B:
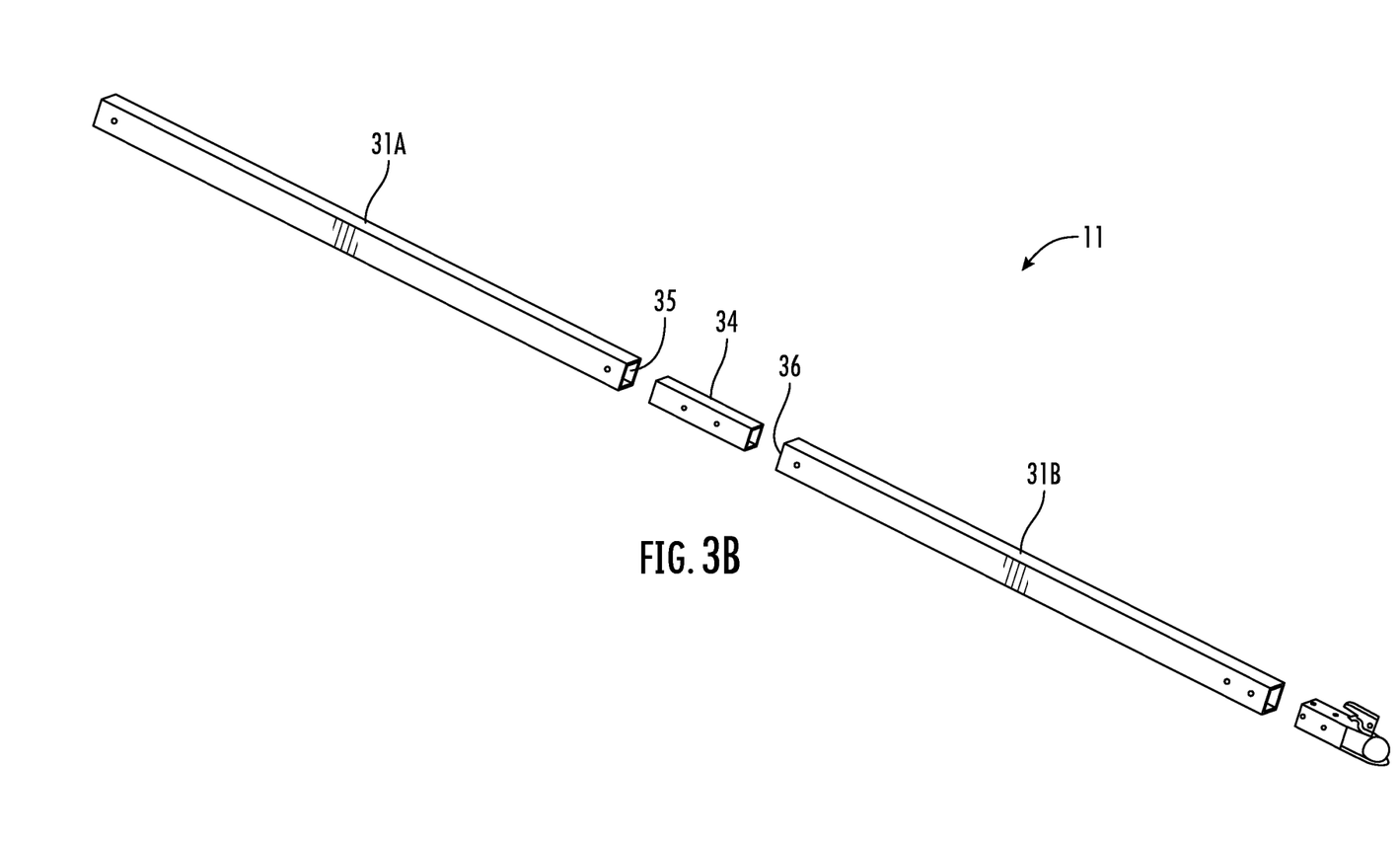
FIG. 3B is an illustration showing the tongue assembly 12 exploded to show component parts.

FIG. 3B is an illustration showing the tongue assembly 12 described with reference to FIG. 3A. The tongue assembly in FIG. 3B is exploded to show that it can be disassembled, and to show a tongue connector 34 that when inserted into an end 35 of the tongue 31A and into and end 36 of the tongue 31B connects one tongue section to the other tongue section.

Figure 4A:
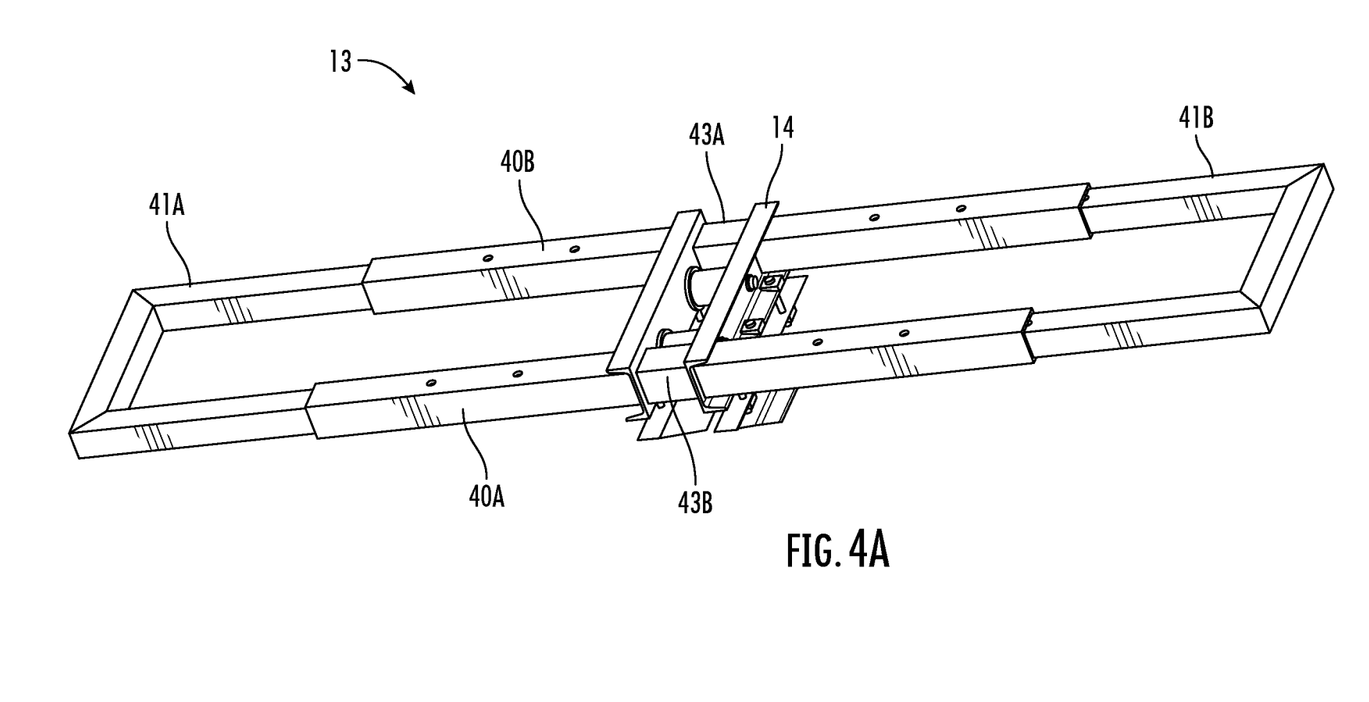
FIG. 4A is an illustration showing a front hoop assembly 13 comprising the trailer assembly 10.

FIG. 4A is an illustration showing the front hoop assembly 13 described earlier with reference to FIG. 1. The assembly 13 is comprised of front hoop tubes 40A and 40B, two front hoop sliders 41A and 41B, and a front hoop carriage assembly 14. The front hoop tubes are parallel with respect to each other, and the front hoop sliders 41A and 41B are shown to be slidably connected into opposite ends of the tubes 40A and 40B respectively. The hoop sliders 41A and 41B are held in position with respect to the front hoop tubes by clevis pins which are inserted into through holes in the tubes 40A and 40B and the sliders 41A and 41B. The tubes 40A and 40B have a four-sided polygonal shape with the dimension of each side of the polygon being 3 inches in width and the metal thickness being ¼ inch, and the sliders 41A an 41B also have a four-sided polygonal shape with the dimension of each side of the polygon being 2.5 inches wide and the metal thickness being ¼ inch. The carriage assembly 14 can be connected to the front hoop assembly at the mid-points 43A and 43B along the lengths of the front hoop tubes 40A and 40B. The design and operation of the carriage assembly 14 will be described later in detail with reference to FIGS. 5A and 5B. As with the axle hoop assembly 11, the front hoop assembly 13 is designed so that each ATV wheel is securely supported by the hoop assembly 1\4 in only two places. This hoop design minimizes the metal material needed to support an ATV wheel which minimizes the axle hoop assembly weight, and has the further advantage of allowing the axle hoop assembly to securely support ATVs having a range of wheel diameters.

Figure 4B:
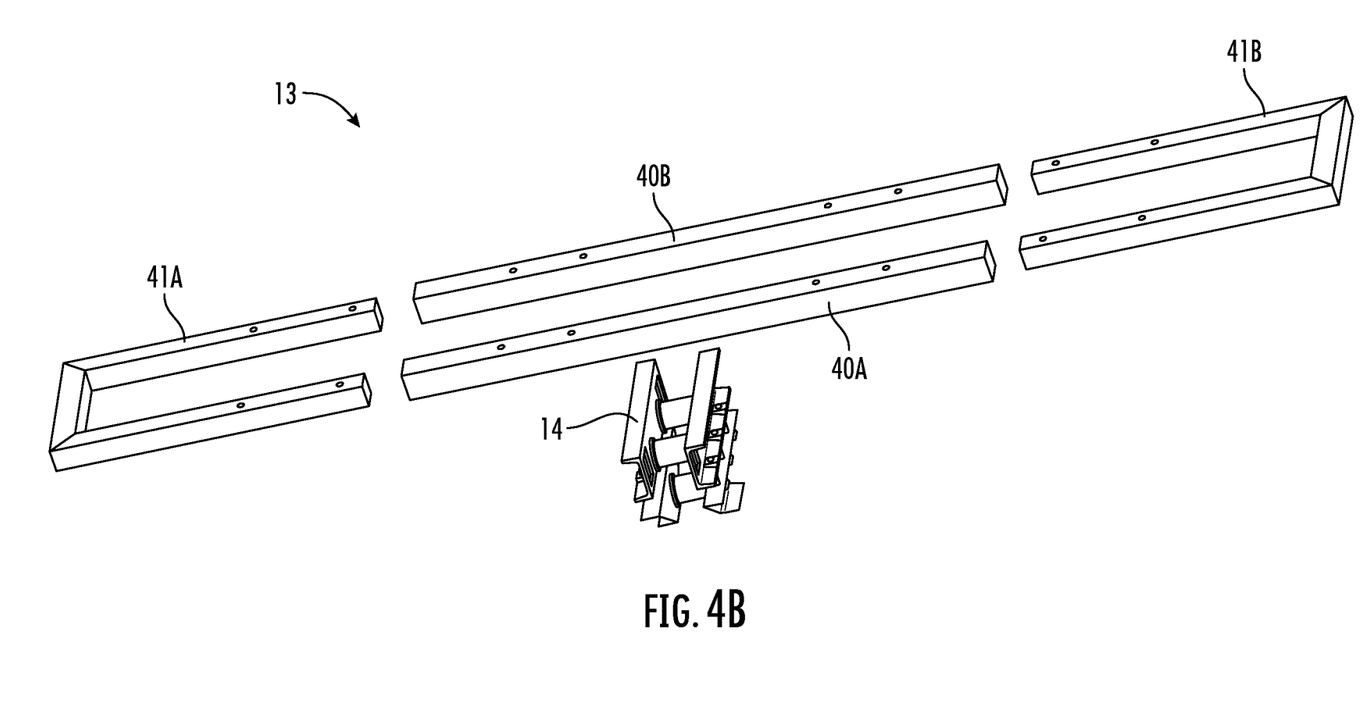
FIG. 4B is an illustration showing the front hoop assembly 13 exploded to show component parts.

FIG. 4B is an exploded view of the front hoop assembly 13, described earlier with reference to FIG. 4A, that serves to illustrate the component parts of the assembly 13. The slider hoops 41A and 41B are inserted into opposite ends of the front hoop tubes 41A and 40B, and can be held in place by clevis pins as described earlier with reference to FIG. 4A. According to this embodiment, the front hoop sliders are shown to in "U" shape. Depending upon an axle length of any particular ATV being carried by the trailer 10, the end-to-end length of the front hoop assembly 13 can be adjusted by simply removing the clevis pins and moving the sliders 41A and 41B into or pulling them out of the front hoop tubes 40A and 40B and then replacing the pins. In this regard, the front hoop assembly has telescoping functionality.

Figure 5A:
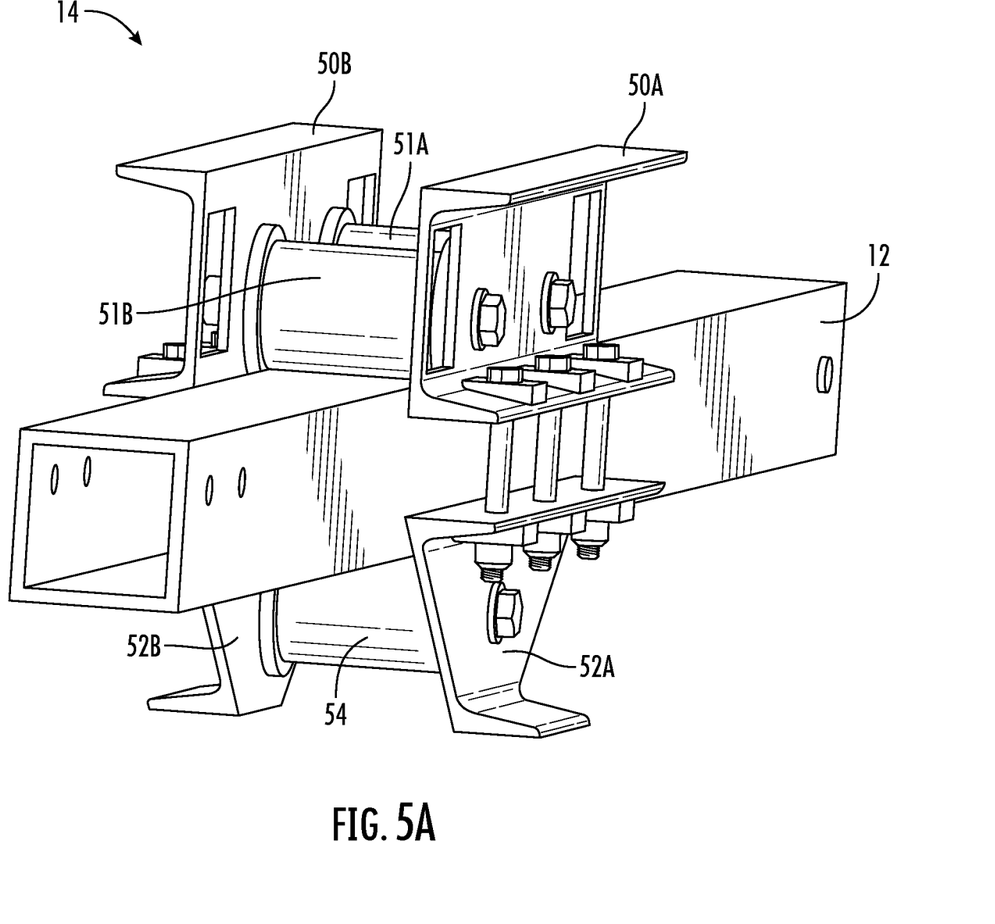
FIG. 5A is an illustration showing a front hoop carriage assembly 12 comprising the trailer assembly 10 with a portion of the tongue assembly 12.

FIG. 5A is an illustration showing the front hoop carriage assembly 14 riding on a portion of a top surface of the tongue assembly 12. The carriage assembly 14 is comprised of two top C channels 50A and 50B between which are retained two slider wheels 51A and 51B so that both wheels are in contact with a top surface of the tongue assembly 12. The position of each top slider wheel between the two top C channels is retained by a bolt that passes into a hole in one of the top C channels, through a slider wheel and out of a hole in an opposite top C channel. The bolts are secured with nuts as shown in FIG. 5. Further, the carriage assembly 14 is also comprised of two bottom C channels 52A and 52B between which is retained one slider wheel 54 so that it is in contact with a bottom surface of the tongue assembly that is opposite to the top surface. As shown in FIG. 5A, each of the two bottom C channels are fixedly connected to each of the two top C channels by two or more bolts that pass-through holes in the top C channels and through holes in bottom C channels, and being secured by nuts that when tightened securely pull the bottom slider wheel and the top slider wheels into contact with the bottom and top surfaces of the tongue assembly respectively. The bottom slider wheel serves to maintain the top slider wheels in substantially continuous contact with the top surface of the carriage assembly during a time that the front hoop assembly 13 is moved from one position to another along the tongue assembly 13.

Figure 5B:
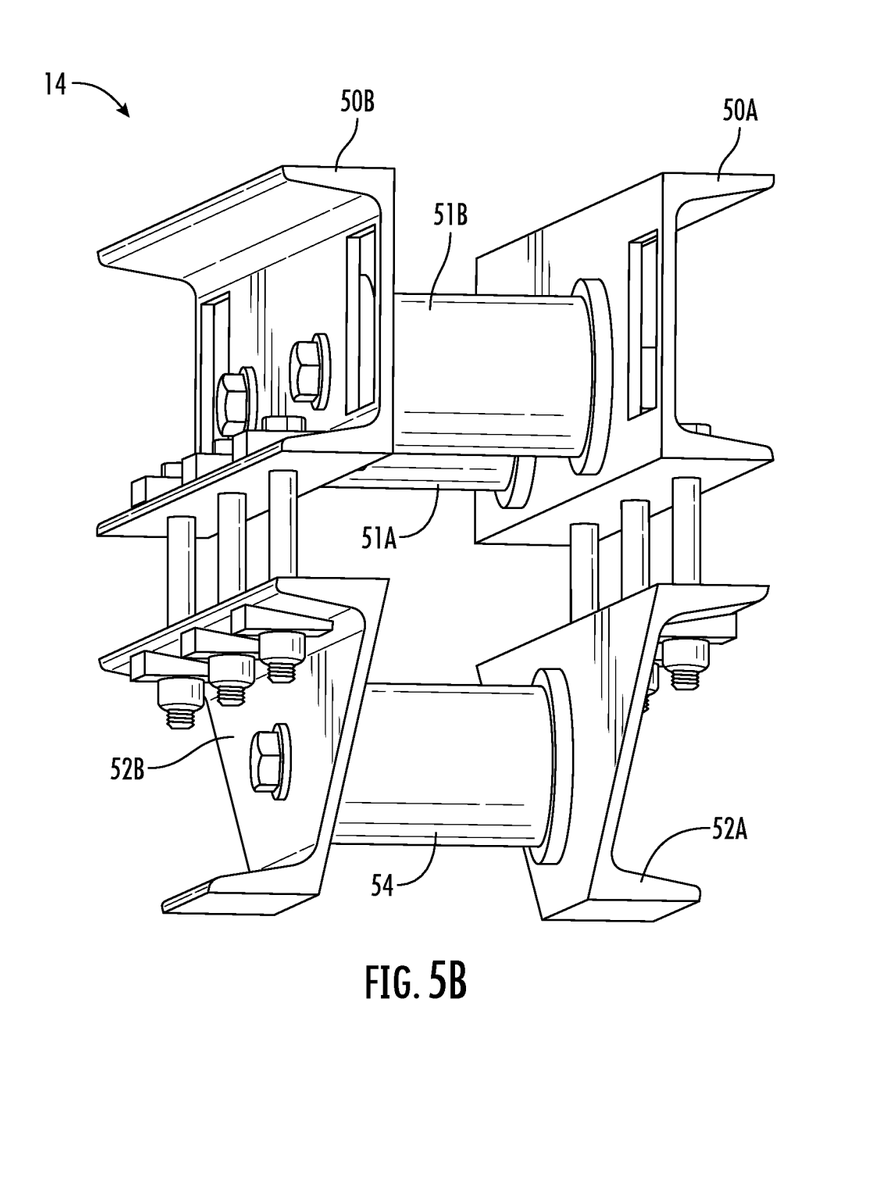
FIG. 5B is another illustration showing the front hoop carriage assembly 14 without the portion of the tongue assembly 12.

FIG. 5B is an illustration showing the front hoop carriage assembly 14 described with reference with FIG. 5A without the portion of the tongue assembly 14.

Figure 5C:
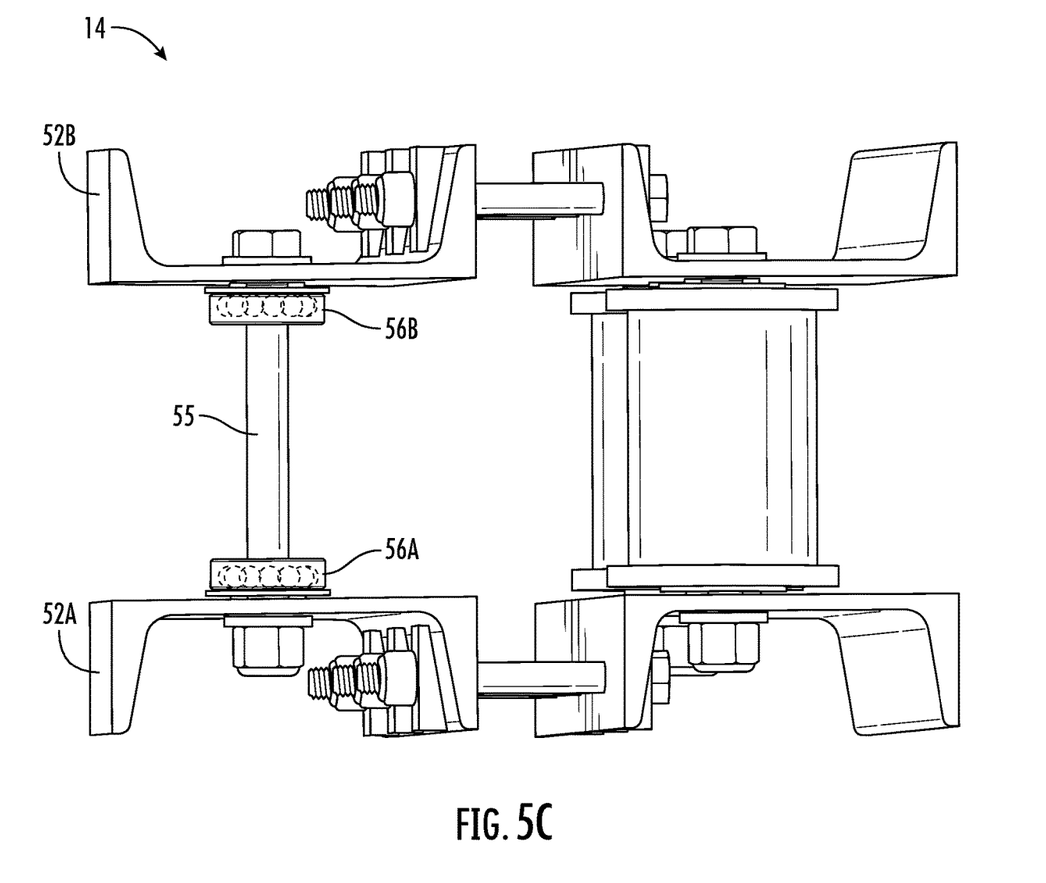
FIG. 5C is an illustration of the front hoop carriage assembly 14 showing bearings 56A and 56B.

FIG. 5C is an illustration showing the front hoop carriage assembly 14 without the bottom slider wheel 54. The bottom slider wheel (not shown) rotates on bearings 56A and 56B mounted in the wheel, and a bolt 55 through both bottom C channels and the bearings serves to retains the slider wheel in place between the two bottom C channels 52A and 52B. The two bearings 56A and 56B fit into a bearing cavity (shown with reference to FIG. 5D) on opposite ends of the bottom wheel 54.

Figure 6:
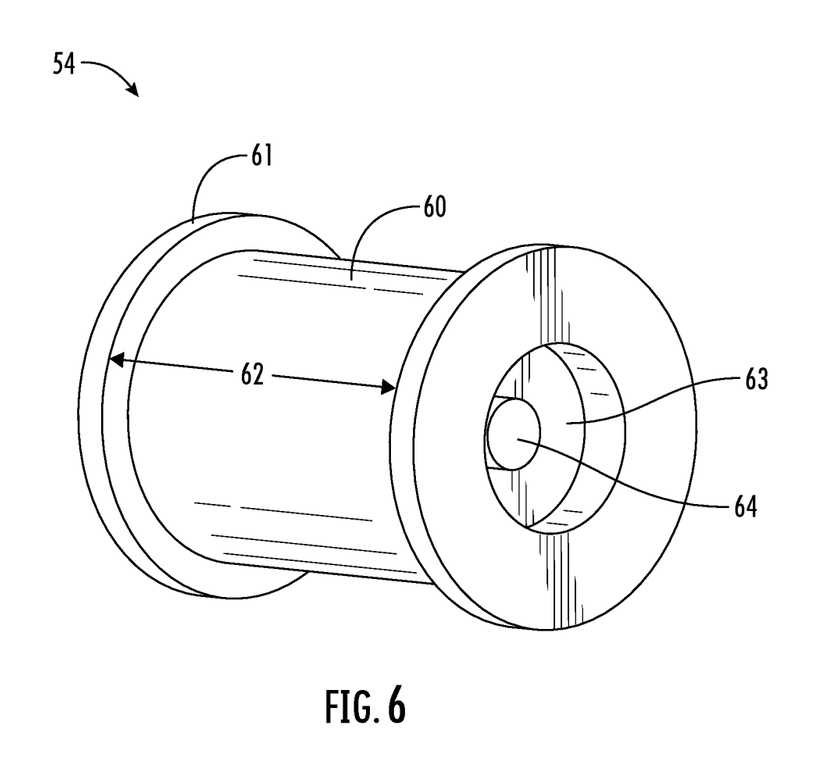
FIG. 6 is an illustration of a bottom slider wheel 54.

FIG. 6 is an illustration showing the slider wheel 54 which is cylindrical in shape, can be fabricated out of a solid piece of metallic material, and has a surface 60 that is in contact with the bottom surface of the tongue assembly 11. The dimension 62 of slider wheel surface 60 should be at least as wide as the surface of the tongue assembly 11, and in this case, is three to three and one sixteenth inches wide. The slider wheel has a lip 61 that functions to retain the position of the slider wheel with respect to the bottom surface of the tongue 14 so that it does not wander from side to side with respect to the bottom surface of the tongue (i.e., tracks in a straight line). This lip can be ¼ inch high, with respect to the surface 60, and can be ¼ inch thick. The outside diameter (including the lip) of the slider wheel 54 can be two and three-quarters of an inch, and the bearing cavity 63, referred to earlier, can be machined into both sides of the wheel to an appropriate depth to receive the bearing, and can be one and three-eighth in diameter. A through hole in the wheel 54 can be machined to receive a bolt, such as the bolt 54 shown in FIG. 5C.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An open trailer assembly for carrying a vehicle, comprising:
    an axle hoop assembly connected to a proximal end of a tongue assembly, and a front hoop assembly connected to the tongue assembly by a carriage assembly and able to ride on the tongue assembly between the axle hoop assembly and a distal end of the tongue assembly;
    wherein each of one or more front tires of the vehicle come into contact with the front hoop assembly in only two places, and each of one or more rear tires of the vehicle come into contact with the axle hoop assembly in only two places while the vehicle is being carried by the open trailer assembly; and wherein the axle hoop assembly has first and second axle hoop sliders inserted into opposing open ends of first and second axle hoop tubes that are oriented parallel with respect to each other and fixedly connected to a support tongue component; and wherein first and second ramps are removably attached to both the first and second axle hoop sliders respectively.

2. The open trailer assembly of claim 1, wherein the tongue assembly is able to be disconnected from both the front hoop assembly and the axle hoop assembly.

3. The open trailer assembly of claim 2, wherein the front hoop assembly is disassembled from the tongue assembly by sliding it off the tongue assembly.

4. The open trailer assembly of claim 1, wherein the axle hoop assembly is connected to the tongue assembly by one or more clevis pins.

5. The open trailer assembly of claim 1, wherein the front hoop assembly has first and second front hoop sliders inserted into opposing open ends of first and second front hoop tubes that are oriented parallel with respect to each other and held in position by the carriage assembly.

6. The open trailer assembly of claim 5, wherein the end-to-end length of the front hoop assembly is adjustable to be longer or shorter by respectively pulling or pushing one or both of the front hoop sliders away from or into the first and second front hoop tubes.

7. The open trailer assembly of claim 1, wherein the first and second ramps are removably attached to first and second ramp supports that are slidably connected to the first and second axle hoop sliders.

8. The open trailer assembly of claim 1, wherein the end-to-end length of the axle hoop assembly is adjustable to be longer or shorter by respectively pulling or pushing one or both of the axle hoop sliders away from or into the first and second axle hoop tubes.

9. The open trailer assembly of claim 1, wherein the carriage assembly is comprised of:

first and second top C channels between which are retained first and second slider wheels both of which are in contact with a top surface of the tongue assembly; and first and second bottom C channels between which is retained a third slider wheel that is in contact with a bottom surface of the tongue assembly and the first and second bottom C channels are connected to the first and second top C channels respectively.

10. The open trailer assembly of claim 9, wherein both the first and second top C channels comprising the carriage assembly are connected to the front hoop by the first and second front hoop tubes, and the combination of the carriage assembly and front hoop assembly is caused to move from a starting position to a final position, with respect to the tongue assembly, by the one or more front tires comprising the vehicle as it moves onto the open trailer assembly.

11. The open trailer assembly of claim 10, wherein the starting position of the front hoop assembly is proximate to the axle hoop assembly, and the final position of the front hoop assembly is a distance from the axle hoop assembly that is determined by a distance between the front tires and the rear tires of the vehicle.

* * * * *